US012794099B2

(12) United States Patent
Bosma et al.

(10) Patent No.: US 12,794,099 B2
(45) Date of Patent: Nov. 10, 2026

(54) DEVICE WITH WAVEGUIDE STRUCTURES

(71) Applicant: NXP B.V., Eindhoven (NL)

(72) Inventors: Sjoerd Bosma, Rotterdam (NL); Giorgio Carluccio, Eindhoven (NL)

(73) Assignee: NXP B.V., Eindhoven (NL)

( * ) Notice: Subject to any disclaimer, the term of this patent is extended or adjusted under 35 U.S.C. 154(b) by 184 days.

(21) Appl. No.: 18/930,302

(22) Filed: Oct. 29, 2024

(65) Prior Publication Data

US 2026/0121274 A1 Apr. 30, 2026

(51) Int. Cl.
*H01P 3/12* (2006.01)
*G01S 7/03* (2006.01)
*H01P 3/127* (2006.01)
*H01Q 1/32* (2006.01)
*H01Q 13/02* (2006.01)

(52) U.S. Cl.
CPC .............. *H01P 3/121* (2013.01); *G01S 7/032* (2013.01); *H01P 3/127* (2013.01); *H01Q 1/32* (2013.01); *H01Q 13/02* (2013.01)

(58) Field of Classification Search
CPC .......... H01P 3/121; H01P 3/127; G01S 7/032; H01Q 1/32; H01Q 13/02; H01Q 1/523; H01Q 21/064
See application file for complete search history.

(56) References Cited

U.S. PATENT DOCUMENTS 6,064,350 A * 5/2000 Uchimura ............... H01P 3/121 343/742
8,803,638 B2 8/2014 Kildal
10,263,310 B2 4/2019 Kildal et al.
10,658,761 B2 5/2020 Hugel et al.
2007/0262828 A1 11/2007 Fujita
(Continued)

FOREIGN PATENT DOCUMENTS

EP 0893842 A2 1/1999

OTHER PUBLICATIONS

P.-S. Kildal, A. Uz Zaman, E. Rajo-Iglesias, E. Alfonso and A. Valero-Nogueira, "Design and experimental verification of ridge gap waveguides in bed of nails for parallel plate mode suppression," IET Microwaves, Antennas & Propagation, vol. 5, iss. 3, pp. 262-270, Mar. 2011.
(Continued)

*Primary Examiner* — Brady W Frazier
*Assistant Examiner* — Juliana Cross
(74) *Attorney, Agent, or Firm* — Andrew C. Milhollin

(57) ABSTRACT

The present disclosure relates to a device, which may be part of an automotive radar system, and which includes a substrate including a first metal layer, at least one dielectric layer, the first metal layer being disposed over the at least one dielectric layer, a second metal layer, the at least one dielectric layer being disposed over the second metal layer, and multiple waveguide structures, each including a portion of the first metal layer and conductive side walls that extend through the at least one dielectric layer from the first metal layer to the second metal layer, the sidewalls defining first openings that extend through the first metal layer, the dielectric layer, and the second metal layer. The first metal layer may include second openings, and each opening of the second openings may laterally surround at least one of the multiple waveguide structures.

20 Claims, 8 Drawing Sheets

(56) References Cited

U.S. PATENT DOCUMENTS

| | | | | |
|---|---|---|---|---|
| 2012/0050131 | A1* | 3/2012 | Hashimoto ............ | H01P 1/042 29/601 |
| 2015/0194718 | A1 | 7/2015 | Kildal et al. | |
| 2023/0187803 | A1* | 6/2023 | Takemoto .............. | H01P 1/042 333/239 |
| 2023/0352841 | A1* | 11/2023 | Vasanelli ............... | H01P 5/107 |
| 2024/0196520 | A1 | 6/2024 | Monedero Miranda et al. | |

OTHER PUBLICATIONS

P.-S. Kildal, E. Alfonso, A. Valero-Nogueira, E. Rajo-Iglesias, "Local metamaterial-based waveguides in gaps between parallel metal plates," IEEE Antennas and Wireless Propagation letters, vol. 8, pp. 84-87, 2009.

* cited by examiner

DEVICE WITH WAVEGUIDE STRUCTURES

TECHNICAL FIELD

Embodiments of the subject matter described herein relate generally to devices with waveguide structures, such as radio frequency (RF) devices with antenna assemblies having waveguide structures formed in a substrate to which an antenna structure is attached.

BACKGROUND

The use of millimeter-wave (mm-wave) frequencies in communication devices and radar applications, such as automotive radar applications, is continuously expanding. Antennas are critical components in all these fields, and come with advanced requirements in terms of performance, size, weight, and compliance to environmental standards. At mm-wave frequencies, the radio frequency (RF)-performance of a given communication system or radar system is no longer determined only by the transceiver circuits and the antenna, but also strongly depends on the package and the interconnection between the transceiver and the antenna. Such interconnection can include a combination of one or more conductive traces, waveguides, ball grid arrays, or other coupling structures.

BRIEF DESCRIPTION OF DRAWINGS

A more complete understanding of the subject matter may be derived by referring to the detailed description and claims when considered in conjunction with the following figures, wherein like reference numbers refer to similar elements throughout the figures. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, wherein:

DETAILED DESCRIPTION

Figure 1:
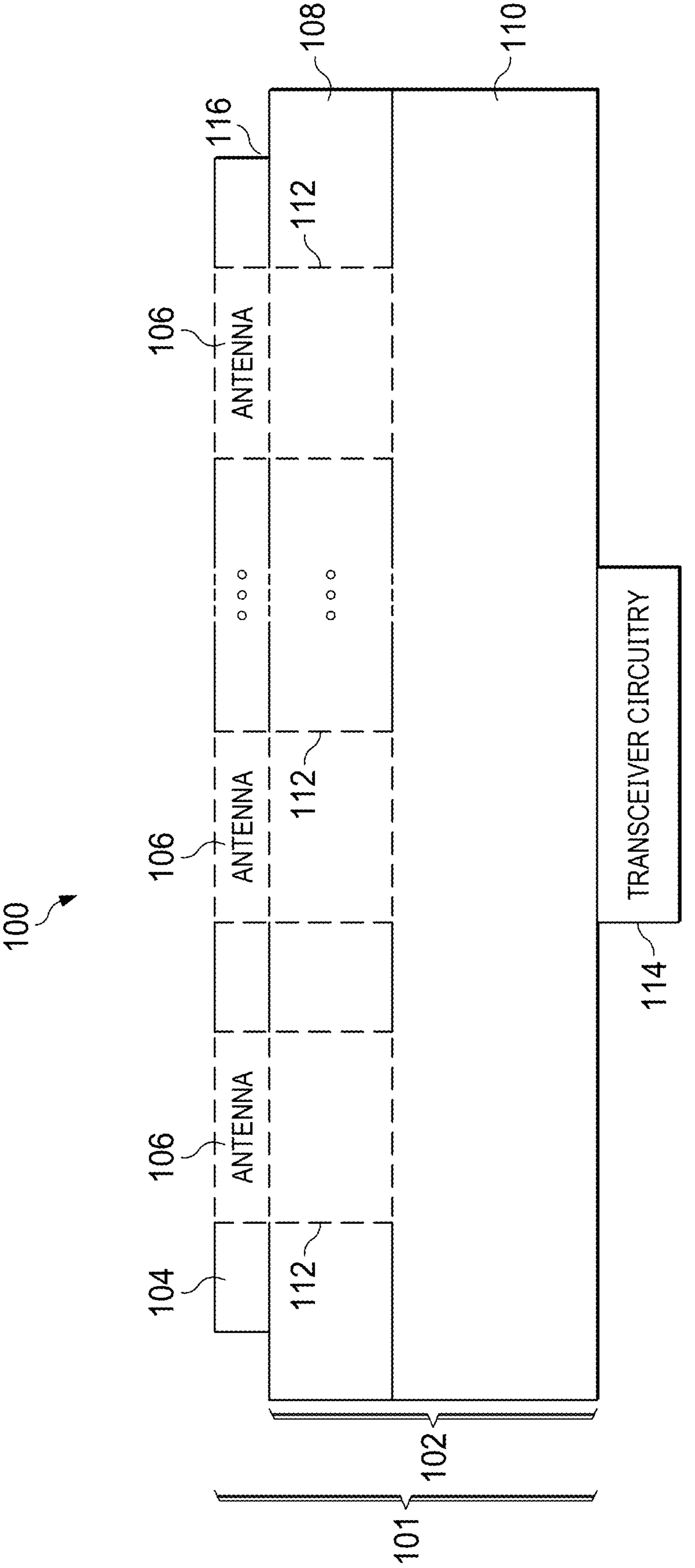
FIG. 1 shows a cross-sectional side view of an illustrative radio frequency (RF) device that includes an antenna assembly, in accordance with various embodiments.

The following detailed description is merely illustrative in nature and is not intended to limit the embodiments described herein and uses of such embodiments. Furthermore, there is no intention to be bound by any expressed or implied theory presented in the preceding technical field, background, or the following detailed description.

For simplicity and clarity of illustration, the figures illustrate the general manner of construction. Descriptions and details of well-known features and techniques may be omitted from the following detailed description to avoid unnecessarily obscuring the present disclosure. For example, the dimensions of some of the elements or regions in the figures may be exaggerated relative to other elements or regions to help improve understanding of embodiments described herein.

The terms “first,” “second,” “third,” “fourth” and the like in the description and the claims, if any, may be used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms “comprise,” “include,” “have” and any variations thereof, are intended to cover non-exclusive inclusions, such that a process, method, article, or apparatus that comprises a list of elements is not necessarily limited to those elements but may include other elements not expressly listed or inherent to such process, method, article, or apparatus. As used herein the terms “approximate,” “approximately,” “substantial” and “substantially” mean sufficient to accomplish the stated purpose in a practical manner and that minor imperfections, if any, are not significant for the stated purpose.

Along these lines, when used with references to measurable quantities including, but not limited to, dimensions, these terms mean that the quantities are equal to the values stated subject to accepted tolerances of any methods or apparatus chosen to fabricate the described structures or measure the quantities or dimensions described. Directional references such as “top,” “bottom,” “left,” “right,” “above,” “below,” and so forth, unless otherwise stated, are not intended to require any preferred orientation and are made with reference to the orientation of the corresponding figure or figures for purposes of illustration. As used herein, the words “exemplary” and “example” mean “serving as an example, instance, or illustration.” Any implementation described herein as exemplary or an example is not necessarily to be construed as preferred or advantageous over other implementations. In addition, certain terms may also be used herein for reference only, and thus are not intended to be limiting.

Herein, elements or nodes or features are sometimes referred to as being “connected” or “coupled” together. As used herein, unless expressly stated otherwise, “connected” means that one element is directly joined to (or directly communicates with) another element in an electrical or non-electrical manner, and not necessarily mechanically. Likewise, unless expressly stated otherwise, “coupled” means that one element is directly or indirectly joined to (or directly or indirectly communicates with) another element in an electrical or non-electrical manner, and not necessarily mechanically. Thus, although the schematic illustrations shown in the figures depict exemplary arrangements of elements, additional intervening elements, devices, features, or components may be present in one or more embodiments of the depicted subject matter.

Various embodiments described herein relate to antennas and waveguide structures, which may be included as part of a package for a radio frequency (RF) device. Such a radio frequency (RF) device may include transceiver circuitry for radar systems (e.g., automotive radar systems) or wireless communications systems, as non-limiting examples. The antennas and waveguide structure may be part of an antenna assembly. The antenna assembly may include an antenna structure and a metallized substrate, such as a printed circuit board (PCB), where waveguide structures are formed in layers near a top surface of the substrate. The antenna assembly may include one or more antennas antenna elements, such as slot antennas, formed in or from electrically conductive (e.g., metal) material of the antenna assembly. The waveguide structures may interface with the antenna structure, with each waveguide structure being aligned with a respective antenna element of the antenna structure, such that signals may be provided between each waveguide structure and the corresponding antenna element. It should be understood that the use of slot antennas in one or more embodiments of the antenna assembly is intended to be illustrative and non-limiting, such that, in one or more other embodiments the antenna assembly may include other suitable types of antennas, which may include other waveguide-based antennas such as horn antennas as a non-limiting example. In one or more embodiments, each waveguide structure may extend from a first metal layer of the substrate to a second metal layer of the substrate, with conductive (e.g., metal) side walls of the waveguide structure extending through at least one dielectric layer of the substrate. The layers of the substrate that include the waveguide structures are sometimes referred to herein, collectively with the waveguide structures, as a "waveguide arrangement." Herein, "conductive" means "electrically conductive" unless otherwise indicated.

Conventional antenna assemblies frequently encounter performance issues caused by air gaps between the metal antenna structure and the substrate of such assemblies. Such air gaps are typically caused by manufacturing tolerances, lack of space for tightening screws close to the chip, or mechanically- or thermally-induced stresses, to list a few examples. Such causes may be challenging to avoid or mitigate in practice, often leading to air gaps on the order of hundreds of micrometers or greater. Such air gaps are typically detrimental to RF performance, resulting in undesirable insertion loss, interference from nearby channels, or noise, which tends to worsen with increasing signal frequency.

Embodiments herein address these challenges by providing an antenna assembly that includes waveguide structures formed in a substrate (e.g., a printed circuit board substrate) from a first metal layer of the substrate, a second metal layer of the substrate, and metallized side walls that pass through one or more dielectric layers of the substrate. In one or more embodiments, each waveguide structure has an associated opening formed around the waveguide structure (e.g., where the opening may be formed by removing the first metal layer to expose the one or more dielectric layers of the substrate). In one or more embodiments, electrically conductive (e.g., metal-coated or metal-filled) vias may be formed in the dielectric layer(s) of the substrate, may extend directly between the first metal layer and the second metal layer, and may electrically connect the first metal layer to the second metal layer. In one or more embodiments, a first plurality of the electrically conductive vias may form a perimeter that extends around the opening and the waveguide structure, thereby laterally surrounding the waveguide structure and the corresponding opening. In one or more embodiments, a second plurality of the electrically conductive vias may extend at least partially around the waveguide structure between the waveguide structure and the opening surrounding the waveguide structure (e.g., along at least part of an inner perimeter defining the opening surrounding the waveguide structure). The second plurality of electrically conductive vias may partially surround (e.g., on at least two sides) the opening defined by the waveguide structure itself (i.e., the opening defined and laterally enclosed by the side walls of the waveguide structure that extend through the dielectric layer(s) of the substrate.

In one or more embodiments, the conductive vias may form a barrier to radio-frequency signals, which might otherwise be coupled to adjacent waveguide structures or to metal layers within the substrate. The conductive vias may isolate the waveguide structures, improving signal integrity and reducing interference and noise coupling between the waveguide structures and between the waveguide structures and the substrate. By forming openings around the waveguide structures in the first metal layer at which the waveguide structures interface with the antenna structure, parallel plate modes between the substrate and the antenna structure be advantageously reduced (e.g., due at least in part to improved electrical isolation between different waveguide openings at the antenna interface) compared to conventional antenna assemblies that do not include openings around such waveguide structures.

FIG. 1 shows a cross-sectional side-view of an illustrative radio frequency (RF) device 100. The RF device 100 includes an antenna assembly 101, and transceiver circuitry 114. The antenna assembly 101 includes a printed circuit board (PCB) 102 (sometimes referred to herein as the "printed circuit board substrate 102" or the "PCB substrate 102") and an antenna structure 104. The antenna structure 104 includes antenna elements 106. In one or more embodiments, the antenna structure 104 may be formed from a single, contiguous piece of electrically conductive material (e.g., metal). In one or more other embodiments, the antenna structure 104 may be formed from a single contiguous piece of metallized plastic. In one or more embodiments, the antenna elements 106 may be formed as slot antennas (e.g., openings) in the electrically conductive material of the antenna structure 104. It should be understood that the use of slot antennas as the antenna elements 106 in the antenna structure 104 is intended to be illustrative and non-limiting, such that, in one or more other embodiments the antenna structure 104 may include other suitable types of antennas, which may include other waveguide-based antennas, such as horn antennas, as a non-limiting example.

In one or more embodiments, the antenna structure 104 may be formed from one or a combination of aluminum, copper, steel, or another suitable electrically conductive material. The antenna structure 104 may be formed as stamped metal, laser-cut metal, or three-dimensional (3D) printed metal, as non-limiting examples.

The PCB 102 includes waveguide structures 112 (sometimes referred to herein as "waveguides 112"). The waveguide structures 112 may be formed from one or more metal layers of the PCB 102 and may include electrically conductive (e.g., metallized) side walls defining respective openings that extend through one or more dielectric layers of the layers 108. The layers 108 in which the waveguide structures 112 are formed are sometimes referred to herein as "waveguide layers 108". The waveguide layers 108 and the waveguide structures 112 are sometimes referred to herein collectively as a "waveguide arrangement".

The PCB 102 may include additional layers 110 that are separate from the waveguide layers 108. In one or more embodiments, additional waveguide structures may be formed in the additional layers 110, which may provide signal paths between the waveguide structures 112 and the transceiver circuitry 114. In one or more other embodiments, the waveguide structures 112 may extend directly through the additional layers 110 to interface with the transceiver circuitry 114 (e.g., to receive signals from and provide signals to the transceiver circuitry 114). The additional layers 110 may include electrically conductive structures (e.g., vias, traces, and the like) that electrically couple (e.g., electrically connect) the transceiver circuitry 114 to the waveguide structures 112. In one or more embodiments, the transceiver circuitry 114 includes an integrated circuit die that is mounted to the PCB 102 via flip chip bonding (e.g., ball bonding), wire bonding, or another suitable bonding technique, as non-limiting examples.

The transceiver circuitry 114 may be configured to generate RF signals to be transmitted via the antenna elements 106 (e.g., in a transmit mode) and may be configured to receive RF signals that are received at the antenna elements 106 (e.g., in a receive mode). In one or more embodiments, electrically conductive structures in the additional layers 110 are arranged to pass RF signals generated by the transceiver circuitry 114 to the antenna elements 106 via the waveguide structures 112, such that the RF signals are wirelessly transmitted via the antenna elements 106, as a non-limiting example. In one or more embodiments, the electrically conductive structures in the additional layers 110 are arranged such that RF signals received at the antenna elements 106 are provided (e.g., routed) to the transceiver circuitry 114 via the waveguide structures 112.

While the waveguide structures 112 are formed from layers of a PCB in the present example, the illustrated arrangement is intended to be illustrative and non-limiting. For example, in one or more other embodiments, the waveguide structures 112 may instead be formed in a suitable metallized dielectric substrate other than a PCB, such as a Molded Interconnect Device (MID) substrate, a 3D printed substrate or an in-mold electronics (IME) substrate, as non-limiting examples.

In one or more embodiments, the antenna structure 104 may be mounted on or otherwise attached to the PCB 102, such that the antenna structure 104 is secured in place over and in contact with the PCB 102 (e.g., overlapping and completely or substantially covering the waveguide structures 112). In one or more other embodiments, the antenna structure 104 may additionally or alternatively be attached to the PCB 102 using press-fit structures, solder, solder paste, adhesive (e.g., conductive or non-conductive adhesive, such as conductive or non-conductive glue), fasteners (e.g., metal fasteners such as screws), or any suitable combination thereof, as non-limiting examples. In one or more embodiments, each of the antenna elements 106 may overlap (e.g., in a direction normal to an upper surface of the antenna structure 104) a corresponding waveguide structure of the waveguide structures 112 (e.g., with a one-to-one correspondence between the antenna elements 106 and the waveguide structures 112).

Ideally, when attaching an antenna structure to a PCB substrate, the connection between the PCB and the antenna structure would be gapless, with direct contact between a bottom surface of the antenna structure and a top surface of the PCB. However, in practice, one or more air gaps may be present between the surfaces of the antenna structure and the PCB substrate that are supposed to directly contact one another (e.g., at an interface 116 between the antenna structure 104 and the top surface of the PCB 102, in the present example). Such air gaps can be caused by manufacturing tolerances, lack of space for adequately tightening screws, mechanical stresses, or thermal stresses, as non-limiting examples. Such gaps are typically on the order of a few hundred micrometers (e.g., between 0 μm to 300 μm), and can be detrimental to RF performance if not addressed. Conventional approaches attempt to address the problem of air gaps through the introduction of periodic structures formed at the antenna side of the antenna-PCB interface (i.e., formed as part of the antenna structure itself). However, such periodic structure formation adds to manufacturing complexity and results reduced planarity of the antenna-PCB interface.

The RF device 100 of the present example utilizes waveguide structures 112 that are partially formed from portions of a first metal layer of the PCB 102, corresponding to a top surface of the PCB 102, and formed from electrically conductive (e.g., metal) side walls that extend through one or more dielectric layers of the PCB 102 to contact a second metal layer of the PCB 102. In contrast to the conventional approaches described above, the surfaces of the PCB 102 and the antenna structure 104 at the interface 116 are planar or substantially planar (e.g., without the periodic structures of the conventional approaches). Openings may be formed in the first metal layer of the PCB 102 laterally surrounding each of the waveguide structures 112. These openings may extend completely through the first metal layer of the PCB 102, such that a dielectric layer underlying the first metal layer is exposed through the openings. The openings may provide physical separation between each of the waveguide structures 112 and the laterally surrounding portions of the first metal layer, such that the portion of the first metal layer included in a given waveguide structure 112 does not physically contact other portions of the first metal layer. In one or more embodiments, electrically conductive vias may be formed in the waveguide layers 108, extending between the first and second metal layers and through the one or more dielectric layers. The electrically conductive vias may include a first group of conductive vias that surround (e.g., laterally surround) each of the openings that surround the waveguide structures, and may be located at or immediately adjacent to an outer perimeter defining such openings. The electrically conductive vias may include a second group of conductive vias that surround (e.g., laterally surround) the side walls of each of the waveguide structures, and that are located at or immediately adjacent to at least a portion of an inner perimeter of each of the openings that surrounds the waveguide structures.

The waveguide structures 112 and the corresponding openings in the first metal layer of the PCB 102 may be dimensioned and arranged to suppress parallel-plate mode scattering between the PCB 102 and the antenna structure 104, thereby reducing the RF performance impact of air gaps that may occur at the interface 116 between the PCB 102 and the antenna structure 104. In one or more embodiments, the insertion loss from an air gap of 300 μm between the antenna structure 104 and the PCB 102 may be reduced (e.g., by around 1 dB, in some instances) compared to conventional antenna assemblies that lack such an arrangement.

Figure 2:
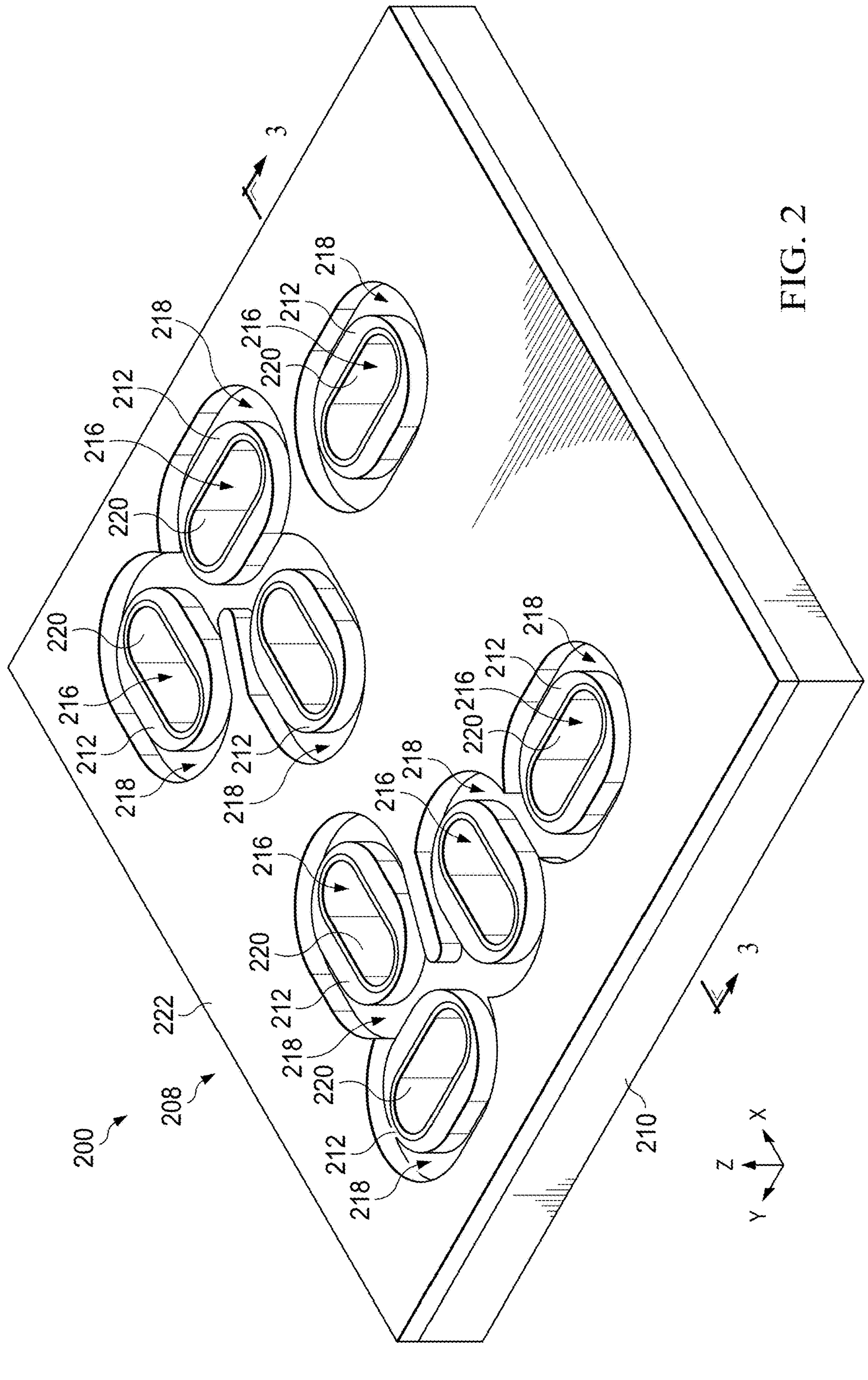
FIG. 2 shows a perspective view of a waveguide arrangement that may be used in an antenna assembly of an RF device, such as the RF device of FIG. 1, in accordance with various embodiments.
Figure 3:
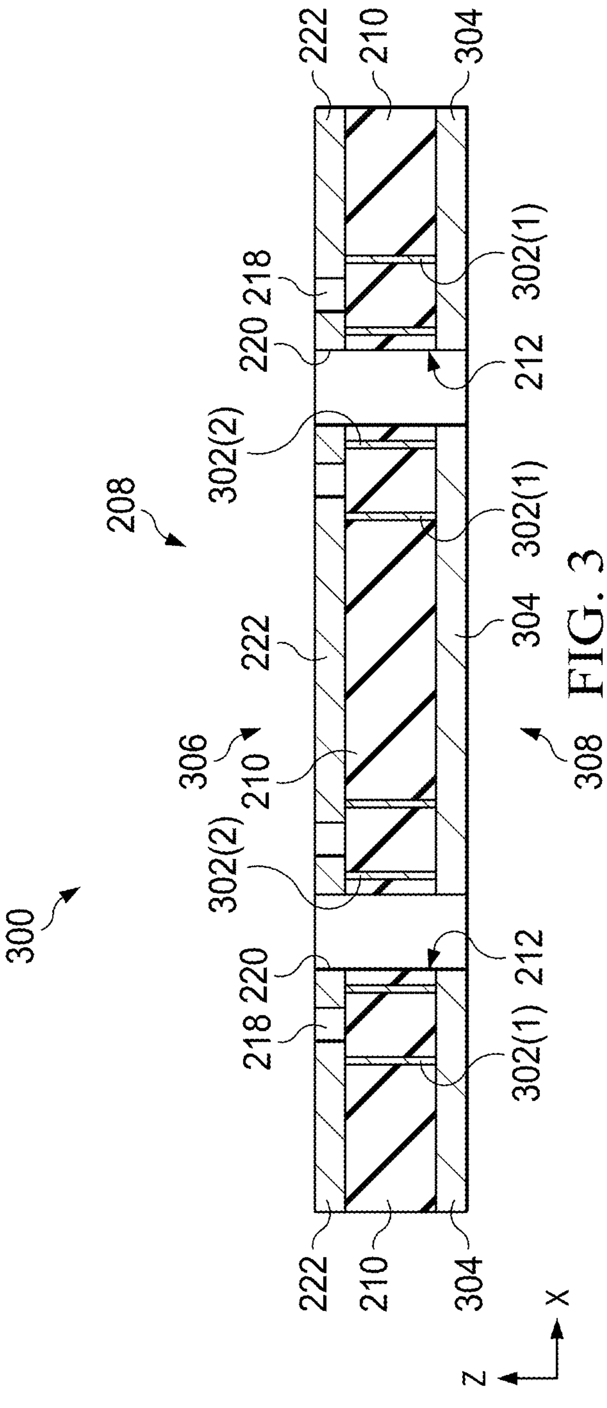
FIG. 3 shows a cross-sectional view of the waveguide arrangement of FIG. 2, in accordance with various embodiments.
Figure 4:
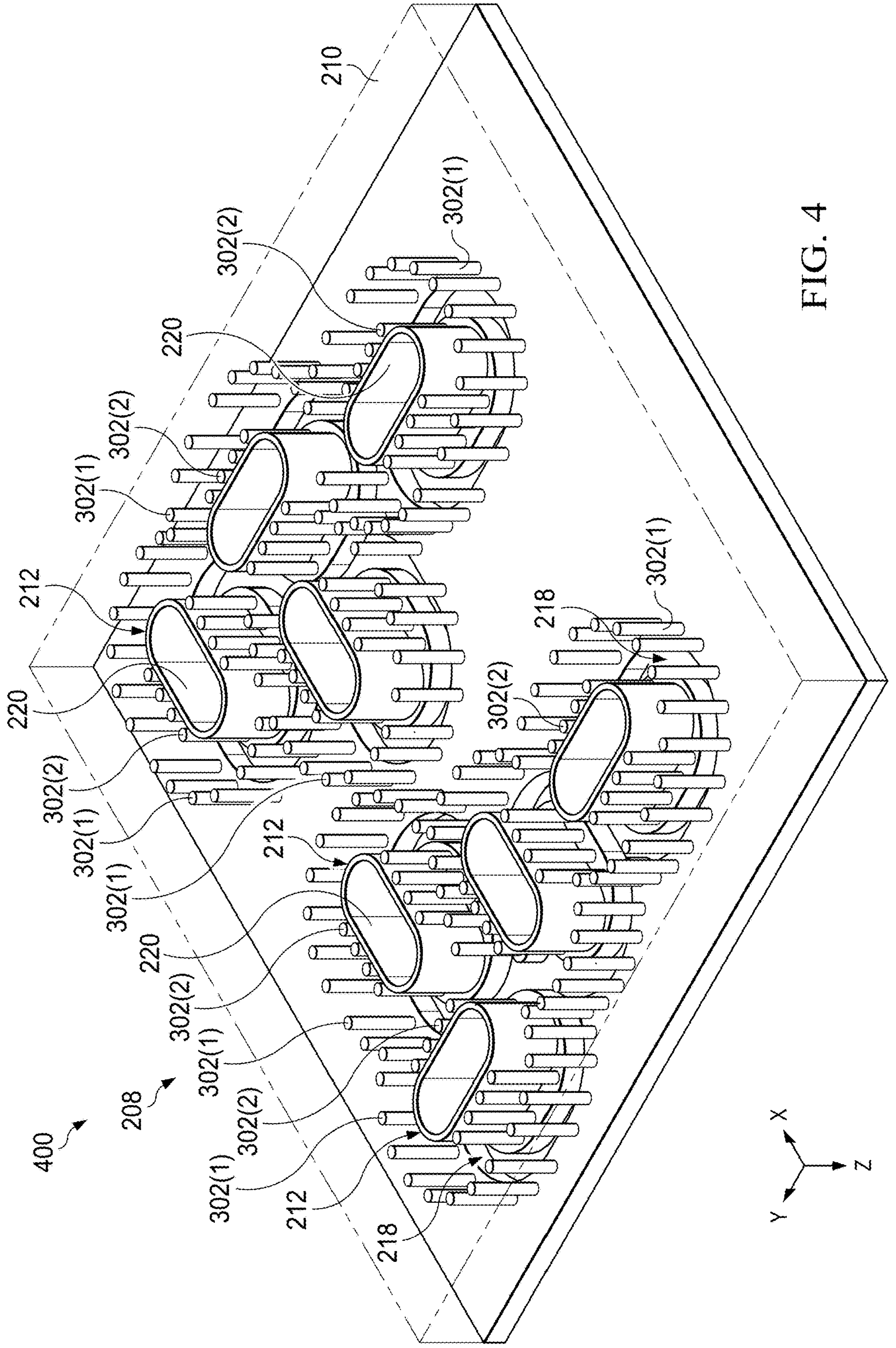
FIG. 4 shows a perspective view of the waveguide arrangement of FIG. 2, rotated relative to the perspective view shown in FIG. 2, with the second metal layer omitted and the dielectric layer shown with partial transparency, in accordance with various embodiments.

FIGS. 2, 3, and 4 show various views 200, 300, and 400 of a waveguide arrangement 208 (e.g., the waveguide arrangement including the waveguide layers 108 and waveguide structures 112 of FIG. 1) and are described concurrently. Each of FIGS. 2, 3, and 4 include axes (e.g., X, Y, Z) for better understanding of the relative orientations of the waveguide arrangement 208 across the views 200, 300, and 400. FIG. 2 shows an illustrative perspective view 200 of the waveguide arrangement 208 that includes waveguide structures 212. FIG. 3 shows a cross-sectional side view 300 of the waveguide arrangement 208 shown in FIG. 2, where the cross-sectional view 300 shows a first metal layer 222, a second metal layer 304, side walls 220 of the waveguide structures 212 that extend between the first and second metal layers 222, one or more dielectric layers 210 disposed between the first and second metal layers 222, and vias 302, which include a first group of vias 302(1) and a second group of vias 302(2). FIG. 4 shows a perspective view 400 (rotated about the X and Z axes relative to the view 200 of FIG. 2), shown with the second metal layer omitted and with partial transparency of the one or more dielectric layers 210.

In one or more embodiments, the waveguide arrangement 208 may correspond to layers of a PCB (e.g., the waveguide layers 108 of the PCB 102 of FIG. 1). In one or more other embodiments, the waveguide arrangement 208 may instead be formed from layers of a suitable metallized dielectric substrate other than a PCB, such as a Molded Interconnect Device (MID) substrate, a 3D printed substrate or an in-mold electronics (IME) substrate, as non-limiting examples.

As shown, the one or more dielectric layers 210 of the waveguide arrangement 208 are disposed directly between the first metal layer 222 and the second metal layer 304. In one or more embodiments, the dielectric layer(s) 210 may include or may be formed from epoxy resin, polyimide, non-woven glass cloth, or any suitable combination thereof (e.g., as a composite material), as non-limiting examples. In one or more embodiments, the first and second metal layers 222, 304 may include or may be formed from copper, iron, nickel, tin, gold, silver, aluminum, another suitable electrically-conductive material, or any suitable combination thereof, as non-limiting examples. In one or more embodiments, such as embodiments in which the dielectric layer(s) 210 include two or more dielectric layers, one or more additional metal layers may be interposed between adjacent dielectric layers of the dielectric layers 210. In one or more embodiments, the distance between the first metal layer 222 and the second metal layer 304 (i.e., the thickness of the dielectric layer(s) 210) is within 10% of a quarter wavelength (e.g., taking into consideration the effect of material properties of, for example, the dielectric layer(s) 210, such as relative dielectric permittivity, on the wavelength) of the RF signals generated by transceiver circuitry (e.g., the transceiver circuitry 114 of FIG. 1) coupled to the waveguide arrangement 208. For example, the distance between the first metal layer 222 and the second metal layer 304 may be around 500 μm to 600 μm, with a tolerance in a range of between 5% and 20%.

The waveguide structures 212 may include portions of the first metal layer 222 and side walls 220 (sometimes referred to as "conductive side walls 220") that extend from the first metal layer 222 and the second metal layer 304. The side walls 220 may be formed from metal that covers portions of the one or more dielectric layers 210 that would otherwise be exposed in the openings 216 (i.e., such that the side walls 220 may be considered "metallized" side walls). In one or more embodiments, the side walls 220 may include or may be formed from copper, iron, nickel, tin, gold, silver, aluminum, another suitable electrically-conductive material, or any suitable combination thereof, as non-limiting examples. In one or more embodiment, the side walls 220 may be formed from the same material as the first metal layer 222 and the second metal layer 304. As shown, the upper surface of the first metal layer 222 is planar or substantially planar, apart from openings 216, 218.

The side walls 220 of each of the waveguide structures 212 may define respective openings 216 that extend through the first and second metal layers 222, 304, and the dielectric layer(s) 210. That is, the openings 216 may each extend completely through the waveguide arrangement 208. In one or more embodiments, the openings 216 may correspond to air-filled cavities. In one or more embodiments, an antenna structure (e.g., the antenna structure 104 of FIG. 1) is attached to the waveguide arrangement 208, In one or more embodiments, the antenna elements of the antenna structure are vertically aligned (e.g., aligned along the Z axis) with the openings 216 of the waveguide structures 212. In one or more other embodiments, the antenna elements of the antenna structure are laterally offset from (i.e., not vertically aligned with respect to) the openings 216 of the waveguide structures 212.

Additional openings 218 may be formed surrounding (e.g., laterally surrounding) each of the waveguide structures 212. The openings 218 may extend completely through the first metal layer 222, such that an upper surface of the dielectric layer or the uppermost dielectric layer of the one or more dielectric layers 210 is exposed through the openings 218. The openings 218 may separate each waveguide structure 212 from laterally surrounding portions of the first metal layer 222. That is, for a given waveguide structure 212, the portion of the first metal layer 222 included in the waveguide structure 212 may be physically separated from all other portions of the first metal layer 222 by a corresponding opening of the openings 218. In one or more embodiments, a single opening of the openings 218 may laterally surround multiple waveguide structures of the waveguide structures 212. In one or more embodiments, a single opening of the openings 218 may laterally surround only a single waveguide structure of the waveguide structures 212. By forming the openings 218 laterally surrounding the waveguide structures 212 (at least with respect to the first metal layer 222), undesirable scattering of parallel plate waveguide modes (e.g., attributable to gapping between the waveguide arrangement 208 and an attached antenna structure, such as the antenna structure 104 of FIG. 1) may be advantageously suppressed or mitigated.

Electrically conductive vias 302 (shown in FIGS. 3 and 4) may be formed in the waveguide arrangement 208. Each of the vias 302 may extend from the first metal layer 222 to the second metal layer 304, and may pass completely through the dielectric layer(s) 210. Each of the vias 302 may make direct physical and electrical contact with the first metal layer 222 and the second metal layer 304. The vias 302 may each include or be formed from copper, iron, nickel, tin, gold, silver, aluminum, another suitable electrically-conductive material, or any suitable combination thereof, as non-limiting examples.

As shown in the view 300, the vias 302 may laterally surround each of the waveguide structures 212. The vias 302 include a first group of vias 302(1) and a second group of vias 302(2). In one or more embodiments, the first group of vias of the vias 302(1) may be disposed at or immediately adjacent to an outer perimeter of each of the openings 218, and a second group of vias 302(2) may be disposed at or immediately adjacent to at least a portion of an inner perimeter of each of the openings 218. In this way, the first group of vias 302(1) may laterally surround each of the openings 218 at their respective outer perimeters, and the second group of vias 302(2) may be laterally surrounded by the openings 218. In one or more embodiments, the second group of vias 302(2) includes subgroups of vias, with each subgroup at least partially surrounding the side walls 220 and associated opening 216 of a corresponding waveguide structure 212 (e.g., with a one-to-one correspondence between subgroups of the second group of vias 302(2) and the corresponding waveguide structures 212). In one or more embodiments, each subgroup of the second group of vias 302(2) is disposed at only two sides (e.g., opposite sides) of the opening 216 to which that subgroup corresponds. In one or more embodiments, the vias 302 may suppress or eliminate parallel plate modes between the first metal layer 222 and the second metal layer 304.

While FIGS. 3 and 4 illustrate the vias 302 surrounding the waveguide structures 212, it should be understood that such an arrangement is illustrative and non-limiting. For example, in one or more other embodiments, the waveguide structures 212 may instead be surrounded by solid metal walls (e.g., encircling the waveguide structures 212; disposed along the boundaries defined by the vias 302 in the illustrated examples).

Figure 5:
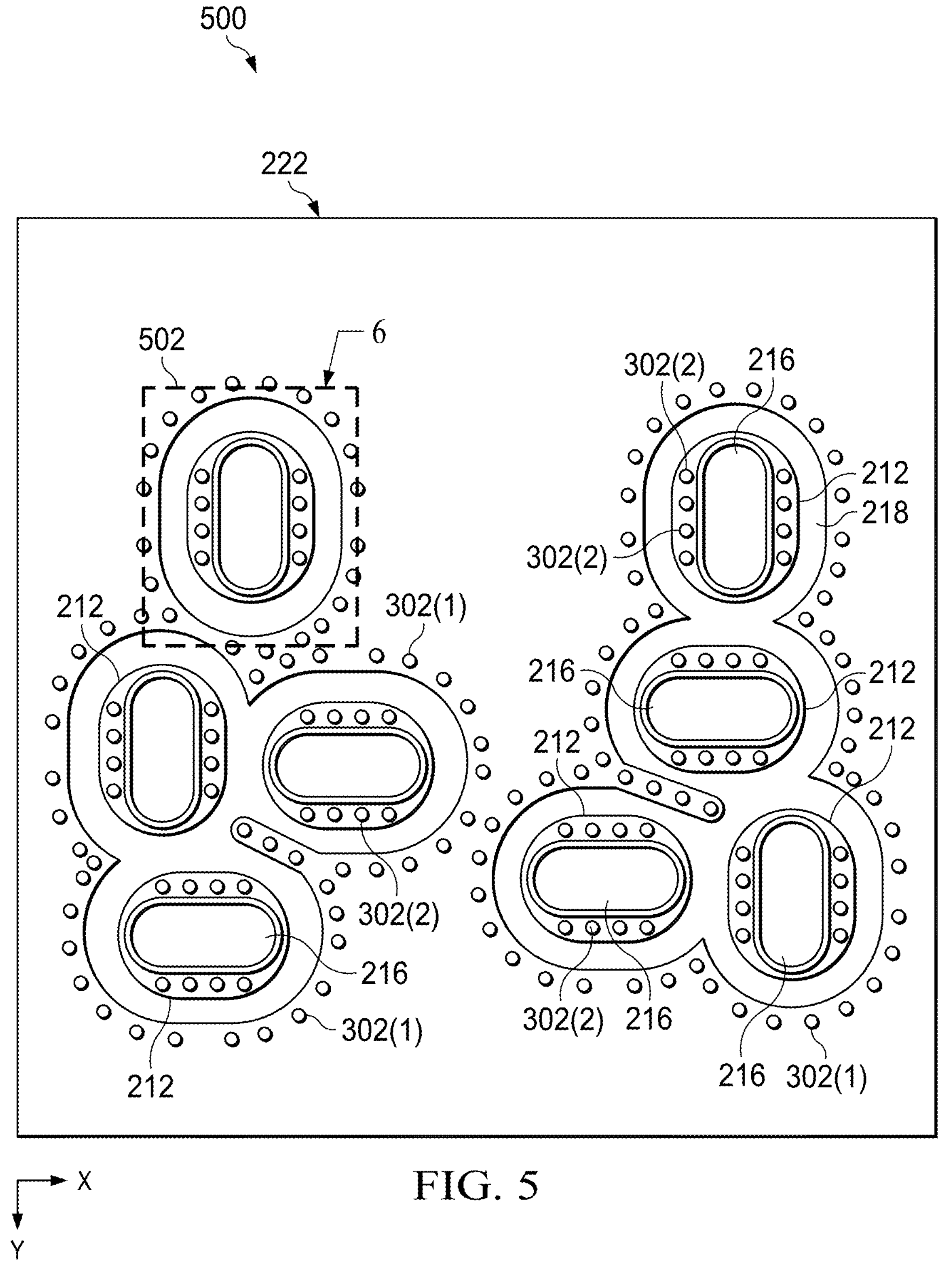
FIG. 5 shows a top-down view of a first metal layer of the waveguide arrangement of FIGS. 2-4, in accordance with various embodiments.

FIG. 5 shows a top-down view 500 of the first metal layer 222 of the waveguide arrangement 208 of FIGS. 2-4. As shown, each portion of the first metal layer 222 included in one of the waveguide structures 212 laterally surrounds a corresponding one of the openings 216 and is laterally surrounded by one of the openings 218. In some regions, such as a region 502, the portion of the first metal layer 222 included in a single waveguide structure 212 is laterally surrounded by a single opening 218, where that opening 218 does not surround the portions of the first metal layer 222 corresponding to any other waveguide structures 212. In other regions, a given opening 218 may laterally surround the portions of the first metal layer 222 corresponding to multiple waveguide structures 212.

In one or more embodiments, each waveguide structure 212 may, at the first metal layer 222, be defined by an outer perimeter. In the present example, the outer perimeter and the cross-section of the waveguide structure 212 are each shown to have the shape of a rounded rectangle (i.e., rectangular, with rounded corners). However, the illustrated shape of the waveguide structures 212 is intended to be illustrative and non-limiting. For example, in one or more other embodiments, the shape of the outer perimeter or cross-section of the waveguide structure may be elliptical, rectangular, circular, or ovoid, dog-bone shaped, or may have other suitable shapes, as non-limiting examples. In one or more embodiments, a portion of a given waveguide structure 212 that is formed from the first metal layer 222 may have first and second edges (e.g., long edges) that are substantially straight, and third and fourth edges that are substantially curved (e.g., short edges), where the third edge extends in an arc between a distal end of the first edge and a distal end of the second edge, and the fourth edge extends in an arc between a proximal end of the first edge and a proximal end of the second edge. The openings 216 and the sidewalls 220 may each have cross-sections that are similar in the shape to the cross-sections of the waveguide structures 212 (e.g., in the shape of a rounded rectangle, in the present example). In one or more embodiments, the outer perimeter defining a given one of the openings 216 or the side walls 220 may have first and second edges (e.g., long edges) that are substantially straight, and third and fourth edges that are substantially curved (e.g., short edges), where the third edge extends in an arc between a distal end of the first edge and a distal end of the second edge, and the fourth edge extends in an arc between a proximal end of the first edge and a proximal end of the second edge. In one or more embodiments, the openings 218 surrounding the waveguides 212 may have outer and inner perimeters that are similar in shape to the outer perimeter or cross-section of the waveguides 212, though increased in scale. In one or more embodiments, openings 218 in relatively close proximity may overlap to effectively form a larger openings that surrounds multiple waveguides 212.

The top-down view 500 further illustrates an example arrangement of the vias 302. It should be noted that, in practice, the vias 302 are not necessarily visible at the top surface of the first metal layer 222. As shown, the first group of vias 302(1) defines an outer perimeter of each of the openings 218, and the second group of vias 302(2) defines at least a portion of an inner perimeter of each of the openings 218. In one or more embodiments, each subgroup of the second group of vias forms partial via fences at or adjacent to two sides (e.g., the long sides) of each of the openings 216 and the sidewalls 220 of the associated waveguides 212). Such partial via fences may at least partially obstruct one or more RF paths between the waveguide structures 212, thereby improving signal integrity and reducing interference and noise coupling between the waveguide structures 212.

For example, the first group of vias 302(1) may laterally surround each of the openings 218 at their respective outer perimeters, and the second group of vias 302(2) is laterally surrounded by corresponding openings of the openings 218, with subgroups of the second group of vias 302(2) laterally surrounding respective openings 216 of the waveguide structures 212 (e.g., with a one-to-one correspondence between subgroups of the second group of vias 302(2) and the corresponding waveguide structures 212). Each subgroup the second group of vias 302(2) may directly contact the portions of the first metal layer 222 that are included in the waveguide structure 212 to which that subgroup corresponds.

It should be understood that the arrangement of the vias 302 shown in the present example is intended to be illustrative and non-limiting. For example, the vias 302 may be arranged along the inner and outer perimeters of the openings 218 with different pitch distances (i.e., distances between adjacent vias) than those currently illustrated, where the pitch distance used may be selected based on the desired or expected frequency of signals to be passed through the waveguide structures 212.

Figure 6:
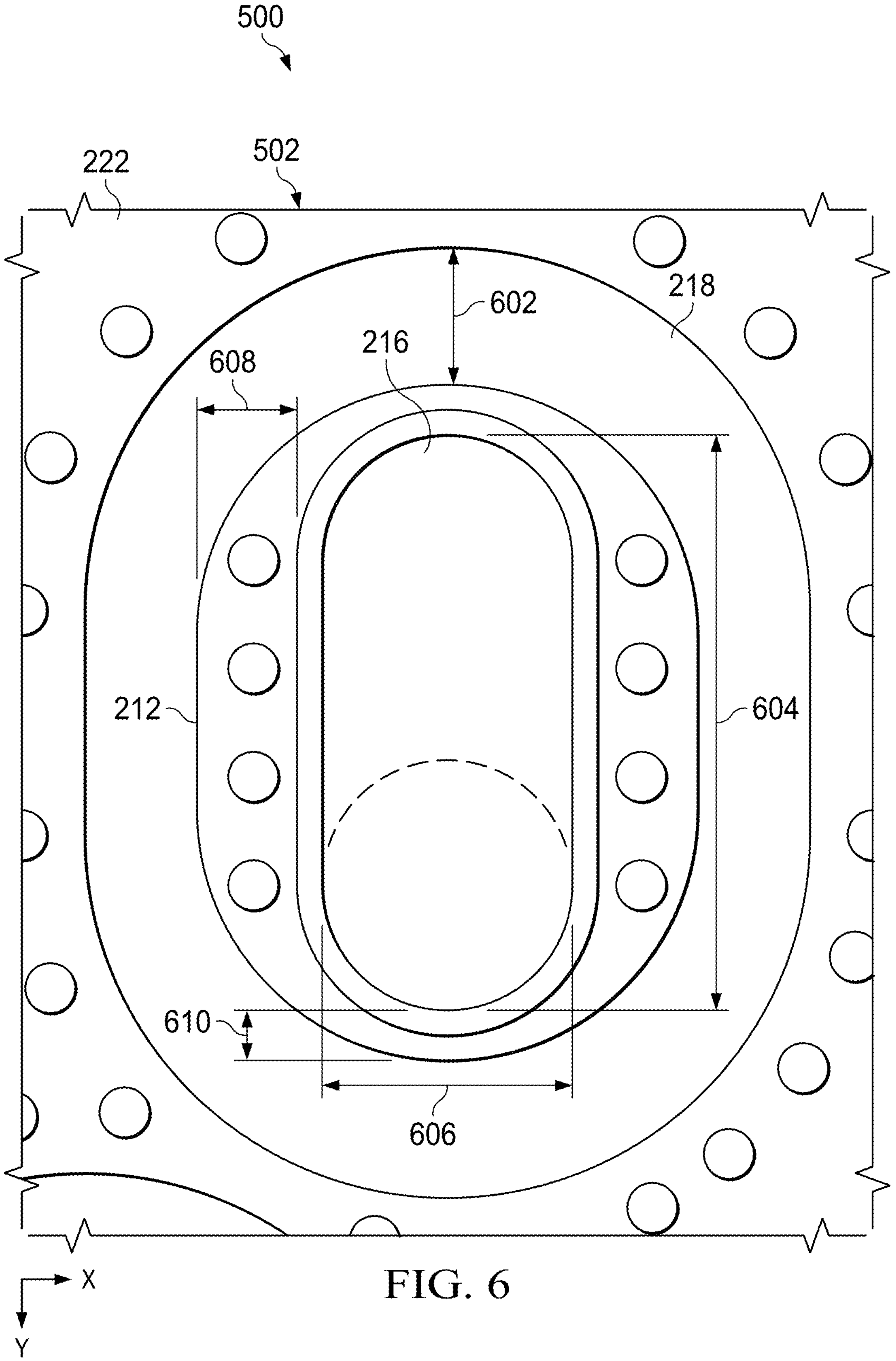
FIG. 6 shows a top-down view of a waveguide structure and a surrounding opening in the first metal layer of FIG. 4, which may be included in the waveguide arrangement of FIGS. 2-4, in accordance with various embodiments.

FIG. 6 shows a top down view of the region 502 of the first metal layer 222 shown in FIG. 5, and illustrates dimensions of openings (e.g., openings 216, 218) and portions of the first metal layer 222 around one of the waveguide structures 212. For example, a distance 602 corresponds to the shortest distance between the waveguide structure 212 and the surrounding portion of the first metal layer 222. For example, the distance 602 may correspond to the width of the opening 218. In one or more embodiments, the distance 602 may be between 400 μm and 600 μm with a tolerance in a range of between 5% and 20%.

A distance 604 corresponds to the length of the opening 216 along its major axis (e.g., with respect to the X-Y plane).

In one or more embodiments, the distance 604 may be between 2400 μm and 2700 μm with a tolerance in a range of between 5% and 20%.

A distance 606 corresponds to the width of the opening 216 along its minor axis (e.g., with respect to the X-Y plane). In one or more embodiments, the distance 606 may be between 1050 μm and 1250 μm with a tolerance in a range of between 5% and 20%.

A distance 608 corresponds to the distance between the opening 216 and the opening 218 at a thick side of the portion of the first metal layer 222 included in the waveguide structure 212. For example, the distance 608 may correspond to a width of the thickest (e.g., along the X direction) section of the portion of the first layer 222 that is included in the waveguide structure 212. In one or more embodiments, the distance 608 may be between 475 μm and 575 μm with a tolerance in a range of between 5% and 20%.

A distance 610 corresponds to the distance between the opening 216 and the opening 218 at a thin side of the portion of the first metal layer 222 included in the waveguide structure 212. In one or more embodiments, the distance 610 may be between 225 μm and 275 μm with a tolerance in a range of between 5% and 20%.

Figure 7:
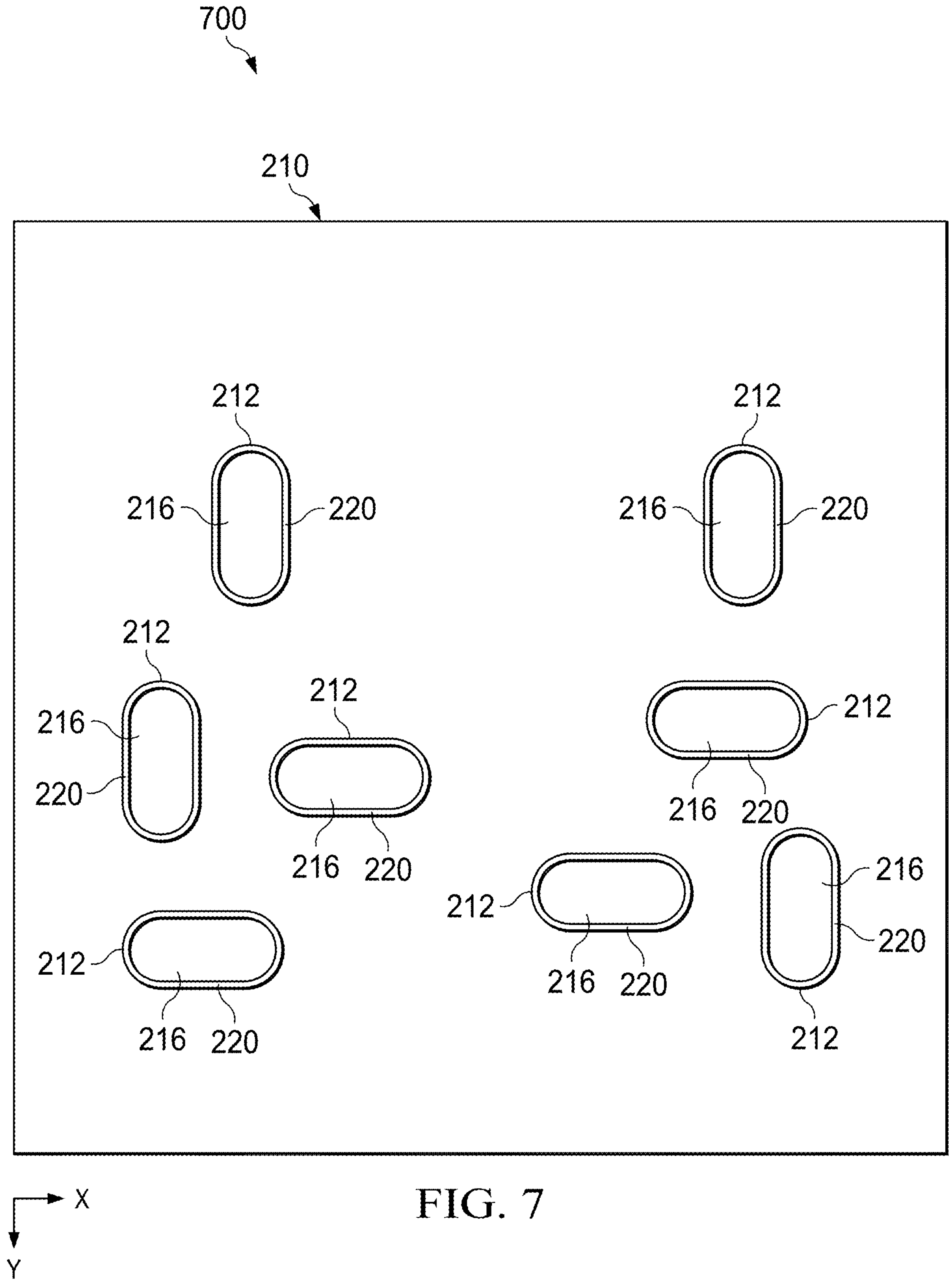
FIG. 7 shows a top-down view of a dielectric layer of the waveguide arrangement of FIGS. 2-4, in accordance with various embodiments.

FIG. 7 shows a top-down view of the dielectric layer(s) 210 of the waveguide arrangement 208 of FIGS. 2-4. While the vias 302 are not shown in the present example, it should be understood that the vias 302 may extend through the dielectric layers 210 in one or more embodiments (e.g., as shown in the view 400 of FIG. 4). As shown, side walls 220 of the waveguide structures 212, which define the openings 216, extend through the dielectric layer(s) 210. The openings 218 shown in the view 500 of FIG. 5 do not extend into the dielectric layers 210.

Figure 8:
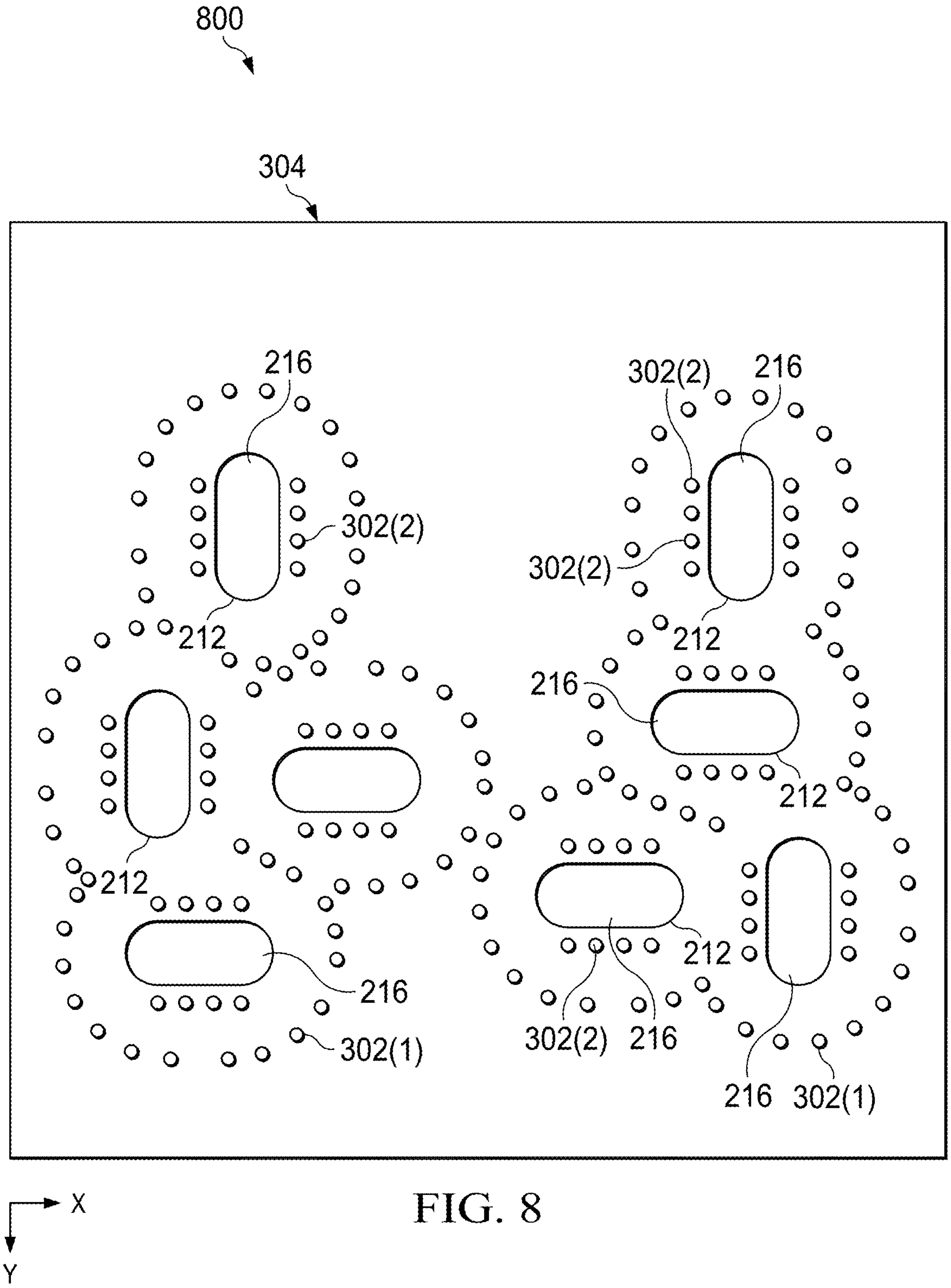
FIG. 8 shows a top-down view of a second metal layer of the waveguide arrangement of FIGS. 2-4, in accordance with various embodiments.

FIG. 8 shows a top-down view 800 of the second metal layer 304 of the waveguide arrangement 208 of FIGS. 2-4. As shown, openings 216, corresponding to the waveguide structures 212, extend through the second metal layer 304. The openings 218 shown in the view 500 of FIG. 5 do not extend into the second metal layer 304.

The top-down view 800 further illustrates an example arrangement of the vias 302. As shown, each of the openings 216 are laterally surrounded by the vias 302. The arrangement of the vias 302 shown in the present example may correspond to that shown in the view 500 of FIG. 5 (e.g., relative to the placement of the openings 216).

Various exemplary embodiments are presented below. Some simplifications and omissions may be made in the following examples, which are intended to highlight and introduce some aspects of the various exemplary embodiments, without limiting the scope.

In an example embodiment, a device includes a substrate including a first metal layer, at least one dielectric layer, the first metal layer being disposed over the at least one dielectric layer, a second metal layer, the at least one dielectric layer being disposed over the second metal layer, and multiple waveguide structures, each including a portion of the first metal layer and conductive side walls that extend through the at least one dielectric layer from the first metal layer to the second metal layer, the sidewalls defining first openings that extend through the first metal layer, the dielectric layer, and the second metal layer. The first metal layer may include second openings, and each opening of the second openings may laterally surround at least one of the multiple waveguide structures.

In one or more embodiments, the device includes first conductive vias extending between the first metal layer and the second metal layer through the at least one dielectric layer and disposed laterally surrounding the second openings, and second conductive vias disposed at opposite sides of each of the multiple waveguide structures.

In one or more embodiments, the first conductive vias define a respective perimeter around each of the second openings.

In one or more embodiments, the second conductive vias define respective perimeters extending along at least two sides of each of the multiple waveguide structures.

In one or more embodiments, the second openings extend through the first metal layer to expose an upper surface of the at least one dielectric layer.

In one or more embodiments, the device includes an antenna structure disposed directly on the first metal layer, the antenna structure including multiple antennas.

In one or more embodiments, the device includes transceiver circuitry attached or coupled to the substrate and configured to generate radio frequency (RF) signals and to provide the RF signals to the antenna structure for transmission via the multiple waveguide structures of the substrate.

In one or more embodiments, a distance between the first metal layer and the second metal layer is within 10% of a quarter wavelength of the RF signals generated by the transceiver circuitry.

In an example embodiment, a device includes a first metal layer, at least one dielectric layer, the first metal layer being disposed over the at least one dielectric layer, a second metal layer, the at least one dielectric layer being disposed over the second metal layer, and waveguide structures defining first openings, each of the waveguide structures extending from the first metal layer to the second metal layer and through the at least one dielectric layer. The first metal layer may include second openings, and each opening of the second openings may laterally surround at least one of the waveguide structures.

In one or more embodiments, each of the waveguides includes a portion of the first metal layer, and conductive side walls that extend through the at least one dielectric layer from the first metal layer to the second metal layer, the sidewalls defining the first openings, and the first openings extending through the first metal layer, the at least one dielectric layer, and the second metal layer.

In one or more embodiments, the device includes first conductive vias extending between the first metal layer and the second metal layer through the at least one dielectric layer and disposed laterally surrounding the second openings, and second conductive vias disposed at opposite sides of each of the waveguide structures.

In one or more embodiments, the first conductive vias define a respective perimeter around each of the second openings, and the second conductive vias define respective perimeters extending along at least two sides of each of the waveguide structures.

In one or more embodiments, the second openings extend through the first metal layer to expose an upper surface of the at least one dielectric layer.

In an example embodiment, a radio frequency (RF) device includes a printed circuit board substrate that includes a first metal layer, at least one dielectric layer, the first metal layer being disposed over the at least one dielectric layer, a second metal layer, the at least one dielectric layer being disposed over the second metal layer, and waveguide structures, each including a portion of the first metal layer and conductive side walls that extend through the at least one dielectric layer from the first metal layer to the second metal layer, the sidewalls defining first openings that extend through the first metal layer, the dielectric layer, and the second metal layer, and an antenna structure disposed on and in contact with the first metal layer of the printed circuit board substrate. The first metal layer may include second openings that laterally surround the waveguide structures.

In one or more embodiments, the RF device includes first conductive vias extending between the first metal layer and the second metal layer through the at least one dielectric layer and disposed laterally surrounding the second openings, and second conductive vias disposed at opposite sides of each of the waveguide structures.

In one or more embodiments, the first conductive vias define a respective perimeter around each of the second openings.

In one or more embodiments, the second conductive vias define respective perimeters extending along at least two sides of each of the waveguide structures.

In one or more embodiments, the second openings extend through the first metal layer to expose an upper surface of the at least one dielectric layer.

In one or more embodiments, the RF device includes transceiver circuitry attached or coupled to the substrate and configured to generate radio frequency (RF) signals and to provide the RF signals to the antenna structure for transmission via the waveguide structures of the substrate.

In one or more embodiments, distance between the first metal layer and the second metal layer is within 10% of a quarter wavelength of the RF signals generated by the transceiver circuitry Although the operations of the method(s) herein are shown and described in a particular order, the order of the operations of each method may be altered so that certain operations may be performed in an inverse order or so that certain operations may be performed, at least in part, concurrently with other operations. In one or more other embodiments, instructions or sub-operations of distinct operations may be implemented in an intermittent and/or alternating manner.

While at least one exemplary embodiment has been presented in the foregoing detailed description, it should be appreciated that a vast number of variations exist. It should also be appreciated that exemplary embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A device comprising:
- a substrate comprising:
  - a first metal layer;
  - at least one dielectric layer, wherein the first metal layer is disposed over the at least one dielectric layer;
  - a second metal layer, wherein the at least one dielectric layer is disposed over the second metal layer; and
  - a plurality of waveguide structures, each comprising a portion of the first metal layer and conductive side walls that extend through the at least one dielectric layer from the first metal layer to the second metal layer, the sidewalls defining a first plurality of openings that extend through the first metal layer, the dielectric layer, and the second metal layer, wherein the first metal layer includes a second plurality of openings, and each opening of the second plurality of openings laterally surrounds at least one of the plurality of waveguide structures.

2. The device of claim 1, further comprising:
- a first plurality of conductive vias extending between the first metal layer and the second metal layer through the at least one dielectric layer and disposed laterally surrounding the second plurality of openings; and
- a second plurality of conductive vias disposed at opposite sides of each of the plurality of waveguide structures.

3. The device of claim 2, wherein the first plurality of conductive vias define a respective perimeter around each of the second plurality of openings.

4. The device of claim 3, wherein the second plurality of conductive vias define respective perimeters extending along at least two sides of each of the plurality of waveguide structures.

5. The device of claim 1, wherein the second plurality of openings extend through the first metal layer to expose an upper surface of the at least one dielectric layer.

6. The device of claim 1, further comprising:
- an antenna structure disposed directly on the first metal layer, the antenna structure comprising a plurality of antennas.

7. The device of claim 6, further comprising:
- transceiver circuitry attached or coupled to the substrate and configured to generate radio frequency (RF) signals and to provide the RF signals to the antenna structure for transmission via the plurality of waveguide structures of the substrate.

8. The device of claim 7, wherein a distance between the first metal layer and the second metal layer is within 10% of a quarter wavelength of the RF signals generated by the transceiver circuitry.

9. A device comprising:
- a first metal layer;
- at least one dielectric layer, wherein the first metal layer is disposed over the at least one dielectric layer;
- a second metal layer, wherein the at least one dielectric layer is disposed over the second metal layer; and
- a plurality of waveguide structures defining a first plurality of openings, each of the plurality of waveguide structures extending from the first metal layer to the second metal layer and through the at least one dielectric layer, wherein the first metal layer includes a second plurality of openings, and each opening of the second plurality of openings laterally surrounds at least one of the plurality of waveguide structures.

10. The device of claim 9, wherein each of the plurality of waveguides comprises:
- a portion of the first metal layer; and
- conductive side walls that extend through the at least one dielectric layer from the first metal layer to the second metal layer, the sidewalls defining the first plurality of openings, and the first plurality of openings extending through the first metal layer, the at least one dielectric layer, and the second metal layer.

11. The device of claim 10, further comprising:
- a first plurality of conductive vias extending between the first metal layer and the second metal layer through the at least one dielectric layer and disposed laterally surrounding the second plurality of openings; and
- a second plurality of conductive vias disposed at opposite sides of each of the plurality of waveguide structures.

12. The device of claim 11, wherein the first plurality of conductive vias define a respective perimeter around each of the second plurality of openings, and the second plurality of conductive vias define respective perimeters extending along at least two sides of each of the plurality of waveguide structures.

13. The device of claim 9, wherein the second plurality of openings extend through the first metal layer to expose an upper surface of the at least one dielectric layer.

14. A radio frequency (RF) device comprising:
- a printed circuit board substrate comprising:
  - a first metal layer;
  - at least one dielectric layer, wherein the first metal layer is disposed over the at least one dielectric layer;
  - a second metal layer, wherein the at least one dielectric layer is disposed over the second metal layer; and
  - a plurality of waveguide structures, each comprising a portion of the first metal layer and conductive side walls that extend through the at least one dielectric layer from the first metal layer to the second metal layer, the sidewalls defining a first plurality of openings that extend through the first metal layer, the dielectric layer, and the second metal layer; and
- an antenna structure disposed on and in contact with the first metal layer of the printed circuit board substrate, wherein the first metal layer includes a second plurality of openings that laterally surround the plurality of waveguide structures.

15. The RF device of claim 14, further comprising:
- a first plurality of conductive vias extending between the first metal layer and the second metal layer through the at least one dielectric layer and disposed laterally surrounding the second plurality of openings; and
- a second plurality of conductive vias disposed at opposite sides of each of the plurality of waveguide structures.

16. The RF device of claim 15, wherein the first plurality of conductive vias define a respective perimeter around each of the second plurality of openings.

17. The RF device of claim 16, wherein the second plurality of conductive vias define respective perimeters extending along at least two sides of each of the plurality of waveguide structures.

18. The RF device of claim 14, wherein the second plurality of openings extend through the first metal layer to expose an upper surface of the at least one dielectric layer.

19. The RF device of claim 14, further comprising:
- transceiver circuitry attached or coupled to the substrate and configured to generate RF signals and to provide the RF signals to the antenna structure for transmission via the plurality of waveguide structures of the substrate.

20. The RF device of claim 19, wherein a distance between the first metal layer and the second metal layer is within 10% of a quarter wavelength of the RF signals generated by the transceiver circuitry.

* * * * *